(12) United States Patent
De Carolis et al.

(10) Patent No.: US 12,163,600 B2
(45) Date of Patent: Dec. 10, 2024

(54) DEVICE AND METHOD FOR ANTICIPATING FAILURE IN A SOLENOID PILOT OPERATED CONTROL VALVE FOR A FIELDBUS MANIFOLD ASSEMBLY

(71) Applicant: ASCO, L.P., Novi, MI (US)

(72) Inventors: Enrico De Carolis, Oakland Township, MI (US); David A. Hoffer, Chesterfield, MI (US)

(73) Assignee: Asco, L.P., Novi, MI (US)

( * ) Notice: Subject to any disclaimer, the term of this patent is extended or adjusted under 35 U.S.C. 154(b) by 133 days.

(21) Appl. No.: 17/793,129

(22) PCT Filed: Feb. 11, 2020

(86) PCT No.: PCT/US2020/017687
§ 371 (c)(1),
(2) Date: Jul. 15, 2022

(87) PCT Pub. No.: WO2021/162679
PCT Pub. Date: Aug. 19, 2021

(65) Prior Publication Data
US 2023/0048892 A1 Feb. 16, 2023

(51) Int. Cl.
*F16K 37/00* (2006.01)
*F16K 31/06* (2006.01)
(52) U.S. Cl.
CPC ...... *F16K 37/0083* (2013.01); *F16K 31/0613* (2013.01)
(58) Field of Classification Search
USPC .................................................. 324/765.01
See application file for complete search history.

(56) References Cited

U.S. PATENT DOCUMENTS

| 4,542,649 A | 9/1985 | Charbonneau et al. |
| 5,524,484 A | 6/1996 | Sullivan |

(Continued)

FOREIGN PATENT DOCUMENTS

| DE | 10137745 A1 | 2/2003 |
| DE | 102013217293 A1 | 3/2015 |

(Continued)

OTHER PUBLICATIONS

Author: R.C. Kryter, Title: "Aging and Service Wear of Solenoid-Operated Valve Used in Safety Systems of Nuclear Power Plants", Date: Jul. 31, 1992, [retrieved on Apr. 16, 2020], Retrieved from the Internet: <URL: https://www.nrc.gov/docs/ML0403/ML040360191.pdf>.

(Continued)

*Primary Examiner* — Vincent Q Nguyen
(74) *Attorney, Agent, or Firm* — Reising Ethington P.C.

(57) ABSTRACT

A fieldbus solenoid valve system has a solenoid operated control valve mounted and operated by a solenoid pilot. A direct current power source is connected to a coil of the solenoid pilot and a driver for actuating the coil. A resistive element is in series with the power source, the driver, the solenoid and a ground. A frequency generator is connected to the circuit for creating a frequency pulse train to the coil having a characterization so as not to cause the solenoid pilot to actuate. The voltage is measured between the coil and resistive element and the measured voltage is compared to a base voltage value measured from the same circuit location. An indicator signal is displayed on the fieldbus solenoid valve system or externally when the measured voltage increases to a predetermined amount from said base voltage over time.

13 Claims, 4 Drawing Sheets

(56) References Cited

U.S. PATENT DOCUMENTS

| | | | |
|---|---|---|---|
| 5,907,467 | A | 5/1999 | Barbour |
| 6,836,121 | B2 | 12/2004 | Barbour et al. |
| 6,917,203 | B1 | 7/2005 | Perotti et al. |
| 8,405,403 | B2 | 3/2013 | Walker |
| 9,886,835 | B2 | 2/2018 | Penning et al. |
| 2007/0012284 | A1* | 1/2007 | Fukushima ........... F02D 41/222 73/114.26 |
| 2010/0201375 | A1 | 8/2010 | Walker |
| 2013/0168187 | A1 | 7/2013 | Conley et al. |
| 2016/0180686 | A1 | 6/2016 | Penning et al. |
| 2018/0212384 | A1 | 7/2018 | Ingles et al. |
| 2021/0131459 | A1* | 5/2021 | Weickel ................ F16K 37/005 |

FOREIGN PATENT DOCUMENTS

| | | |
|---|---|---|
| JP | 11108232 A | 4/1999 |
| WO | 2019055046 A1 | 3/2019 |
| WO | 2021162679 A1 | 8/2021 |

OTHER PUBLICATIONS

PCT International Search Report and Written Opinion, Int. Application No. PCT/US2020/017687, Int. Filing Date: Feb. 11, 2020, Applicant: Asco, L. P., Dated: May 7, 2020.

Extended European Search Report, Application No. 20919035.4-1205, Applicant: Asco, L.P., Dated: Oct. 27, 2023.

Liniger ,Jesper, et al., Early Detection of Coil Failure in Solenoid Valves, IEEE/ASME Transactions on Mechatronics, vol. 25, No. 2, Apr. 2020, pp. 683-693.

Jameson, Noel Jordan, et al., Impedance-Based Condition Monitoring for Insulation Systems Used in Low-Voltage Electromagnetic Coils, IEEE Transactions on Industrial Electronics, vol. 64, No. 5, May 2017, pp. 3748-3757.

Canadian Examination Report, Application No. 3,167,323, Applicant: Asco, L.P., Title: A Device and Method for Anticipating Failure in a Solenoid Pilot Operated Control Valve for a Fieldbus Manifold Assembly, Dated: Oct. 17, 2023.

* cited by examiner

DEVICE AND METHOD FOR ANTICIPATING FAILURE IN A SOLENOID PILOT OPERATED CONTROL VALVE FOR A FIELDBUS MANIFOLD ASSEMBLY

TECHNICAL FIELD

This invention relates to an early warning system for anticipating failure of a solenoid valve control system in a fieldbus manifold assembly.

BACKGROUND OF THE DISCLOSURE

Fieldbus systems incorporating valve manifold assemblies are commonly used in industrial manufacturing to selectively direct pneumatic pressure to various pneumatically operated field devices. The manifold assembly is commonly modular and is generally assembled with a plurality of I/O modules, a communication module, and manifold members. The manifold member includes a manifold block that one or more individual pneumatic control valves are mounted on, and generally referred to as valve stations of the manifold. The pneumatic control valves are often operated by solenoid pilot valves often referred to merely as solenoid pilots which shift a spool in the control valve that controls the direction of pneumatic flow for operating respective field devices. These solenoid pilots are actuated by current running through its coil that creates a magnetic field which pulls the solenoid pilot and opens to allow a pressurized air passage to shift the spool of the valve. The manifold member often has a common pilot pressure passage that is connected to the solenoid pilot of the control valves which in turn control the flow of main pressure to a respective pneumatically operated field device. In other manifolds, a directly operated valve is used where the force of the magnetic field generated by the solenoid coil directly pulls the spool without using air pressure to control the spool. The field device is often a cylinder assembly that has a piston which cycles from a retracted position to an extended position and vice versa, based on the valve's spool position.

These manifold assemblies have the capacity to incorporate many manifold blocks, and valve stations which in turn operate many field devices in a large manufacturing or industrial line. Each control valve needs to be correctly operating to maintain appropriate operation of the respective field device. Failure of a single control valve may cause an entire manufacturing or industrial line to cease operating. Control valve failures are typically caused by mechanical wear but are also affected by solenoid pilot and associated coil degradation. While the coil of the solenoid pilot of the control valve may last a long time due to not having any moving parts, it is still subject to ambient factors that can reduce its useful life. The coil may be in very toxic or dirty environments and be subject to thermal temperature cycles, corrosive chemicals, vibration or dust and dirt. As such, the ambient factors may degrade the coil, particularly the insulating wrap that surrounds the conductive wire, to the point where the control valve's function is affected.

Because unscheduled stoppage of industrial lines affect production and thus translates to loss of revenue, it is highly advantageous to prevent downtime by replacing the affected solenoid coil (or the entire control valve) as they first show signs of degradation before total failure occurs, and replace them during scheduled maintenance and normal down time when production is not affected. This early predictive maintenance can prevent unscheduled cessation of the line and thus prevent loss of production. Replacement of solenoid coils ahead of time, before their complete failure, would be possible if t h e failure of the solenoid coil can be predicted. Prediction of failure is possible when the failure is not sudden and provides some sort of warning over time. In other words, if anomalous behavior or early degradation of performance can be detected as an early warning indicator, then prediction of an imminent failure becomes possible.

Various monitoring methods have been proposed for solenoid control valve systems. One proposal is to monitor the valve spool in the control valve's body based on certain time values. The position of the spool is detected by the use of a magnet mounted on the spool of the control valve and a Hall-effect sensor, or other sensor device, protruding into the control valve body for sensing the proximity of the magnet as the spool moves between its two end positions. The movement is timed and if the measured time slows down beyond normal operating values, the valve is then deemed to be in need of replacement, if pressure and voltage values supplied to the pilot and control valve are constant. Often these timers, pressure sensors and Hall-effect and other sensors are built into the control valve body. This approach however requires the control valve and/or the manifold block to be initially designed and constructed with the appropriate sensors and magnets and does not address the need to reduce modifications to the valve and the unmet need to monitor the many control valves and manifold members that are already installed in automated industrial and assembly lines.

Other proposals are directed to a timing function from actuation of the control valve at the fieldbus manifold to the final cycle position of the field device, for example the cycle time it takes for a piston cylinder to move from a retracted position to an extended position and vice versa. A fieldbus system with computing capability and memory compares the elapsed time signal value with predetermined acceptable elapsed time value and to provide a warning or other indication at the fieldbus modules if an unacceptable variance in the elapsed time valve has occurred compared to the predetermined acceptable elapsed time value. However, this system does not specifically detect degradation of the solenoid coil before failure of the control valve function.

All of the above approaches do not detect the coil health directly because the performance degradation can be caused by other factors like low air pressure, air flow changes, spool valve and system leakage, supply voltage variances or increased component friction. Furthermore, as a solenoid coil degrades, the performance time of the valve system does not necessarily change unless the spool is directly operated. Thus, the use of time and time changes for cycle performance parameters to determine solenoid coil conditions is not effective.

Another proposed system predicts the lifetime of a solenoid coil by measuring the operating temperature of the solenoid coil which requires a separate thermometer device and comparing the temperature to acceptable temperature parameters.

More common approaches that predict coil failure measure and compare the changes of the characteristic current curve of the solenoid coil every time the coil is energized. Changes in this characteristic curve could predict impending failure of the coil, but the sensing devices and the various measurements needed to analyze the characteristic current curve are complicated, expensive, require a complex coil driving circuit, and need a fairly large amount of computing power which is typically not available within a fieldbus manifold.

While the inductance value of a solenoid coil is often stated by a manufacturer, it has been found that solenoid coils often have a significant deviation from the stated inductance value and certain coils have been noted to vary by over 10% from the stated inductance. This variation presents obstacles to determine degradation from the stated inductance level when the initial inductance value may significantly vary.

However, the inductive reactance of an installed coil can be measured during its energization/de-energization cycle if appropriate control schemes are used in the standard driver system. An appropriate control scheme alleviates the need to measure the absolute inductance value of the coil and relies on comparing the initial base inductive reactance value to subsequent measurements to give an indication of inductive reactance changes over time. Since the number of windings has a direct correlation to the inductance value of the coil and therefore inductive reactance, if a short circuit exists between two or more windings, the inductance value of the coil changes accordingly. This change of inductance proportionally changes the measured inductive reactance at a given frequency.

Because a solenoid coil operates on direct current and reactance is based on inductance which is only measurable during change of voltage over time, e.g. during alternating current cycles, previous induction monitoring systems needed separate power supplies and extensive circuitry modifications which made these systems unacceptable for retrograde fitting into existing production systems.

What is desired is to have a system that can check for operation degradation of the solenoid coil in a valve manifold system by using hardware that is already utilized, readily available and/or easily modifiable. Furthermore, it is desired to have a monitoring system that specifically detects the condition of the solenoid coil without actuating any significant movement of the valve during the energization/de-energization cycle.

What is desired is an inductive reactance change detection system that measures the health of a solenoid coil that can be fitted into existing valve bank systems and uses the direct current (DC) source which can also be used to actuate the solenoid coil.

SUMMARY OF THE DISCLOSURE

According to one aspect of the invention, a fieldbus solenoid valve system has a communication module which is connected to at least one manifold member with a valve body having a solenoid operated control valve mounted therein and operated by a solenoid pilot. A direct current power source is connected to a coil of the solenoid pilot. The circuit is also grounded. A driver is connected in series with the direct current power source, the coil for actuating the solenoid pilot, and the ground. A resistive element is also positioned in series with the power source, driver, solenoid pilot and ground.

In one embodiment, the driver has its algorithm programmed to create a frequency pulse train superimposed onto the DC energization signal for the coil of a predetermined duration during actuation of the driver which is dependent on the inductance value of the coil. The driver creates the pulse train that has characteristics that do not cause the solenoid pilot to actuate in response to the pulse train.

When the frequency pulse train is presented to the solenoid pilot coil, the voltage drop is sensed in the circuit and this measurement is sent to a microcontroller which can also be used to control the driver. The measured voltage is compared to a base voltage value previously taken and stored in a microcontroller unit in the circuit. Preferably, the microcontroller records the measured voltage when initially installed and uses this measured voltage as the base voltage. The measured voltage drop is directly proportional to inductance value of solenoid pilot's coil.

Preferably, an indicator signal is displayed on the fieldbus solenoid valve system when the measured voltage increases to a predetermined amount from the base voltage value. In one embodiment, the indicator, corresponding to the control valve on the fieldbus control valve system, is displayed on its communication or I/O unit. In one embodiment, the driver is a low side driver and the resistive element interposed between the low side driver and the coil of the solenoid valve.

In another embodiment, the driver is a high side driver and the coil is interposed between the high side driver and the resistive element.

In one embodiment, the pulse train has a short enough duration in time with a high enough frequency so as not to cause the solenoid pilot to be actuated in response to the pulses. In another embodiment, the pulse train has a low enough magnitude in voltage so as not to cause the solenoid pilot to actuate in response to the pulse train.

According to another aspect of the invention, a method of detecting degradation of a coil in a solenoid coil in a fieldbus valve system includes: the steps of providing a power circuit with a direct current power source that powers the coil, providing a driver that communicates the power source to ground to close and open the power circuit, providing a resistive element in series with the direct current power source, driver and the solenoid coil, generating an initial frequency pulse to the driver having a characteristic so as not to affect actuation of the solenoid coil, measuring the initial voltage drop level during the frequency pulse between the solenoid coil and the resistive element, storing the initial voltage level in a memory device, measuring subsequent voltage levels during subsequent frequency pulses, comparing said subsequent voltage level to said initial voltage level, and providing an indicator warning when said subsequent voltage level has changed a predetermined amount from said initial voltage level.

BRIEF DESCRIPTION OF THE DRAWINGS

Reference now is made to the accompanying drawings in which.

DETAILED DESCRIPTION OF THE PREFERRED EMBODIMENT

Figure 1:
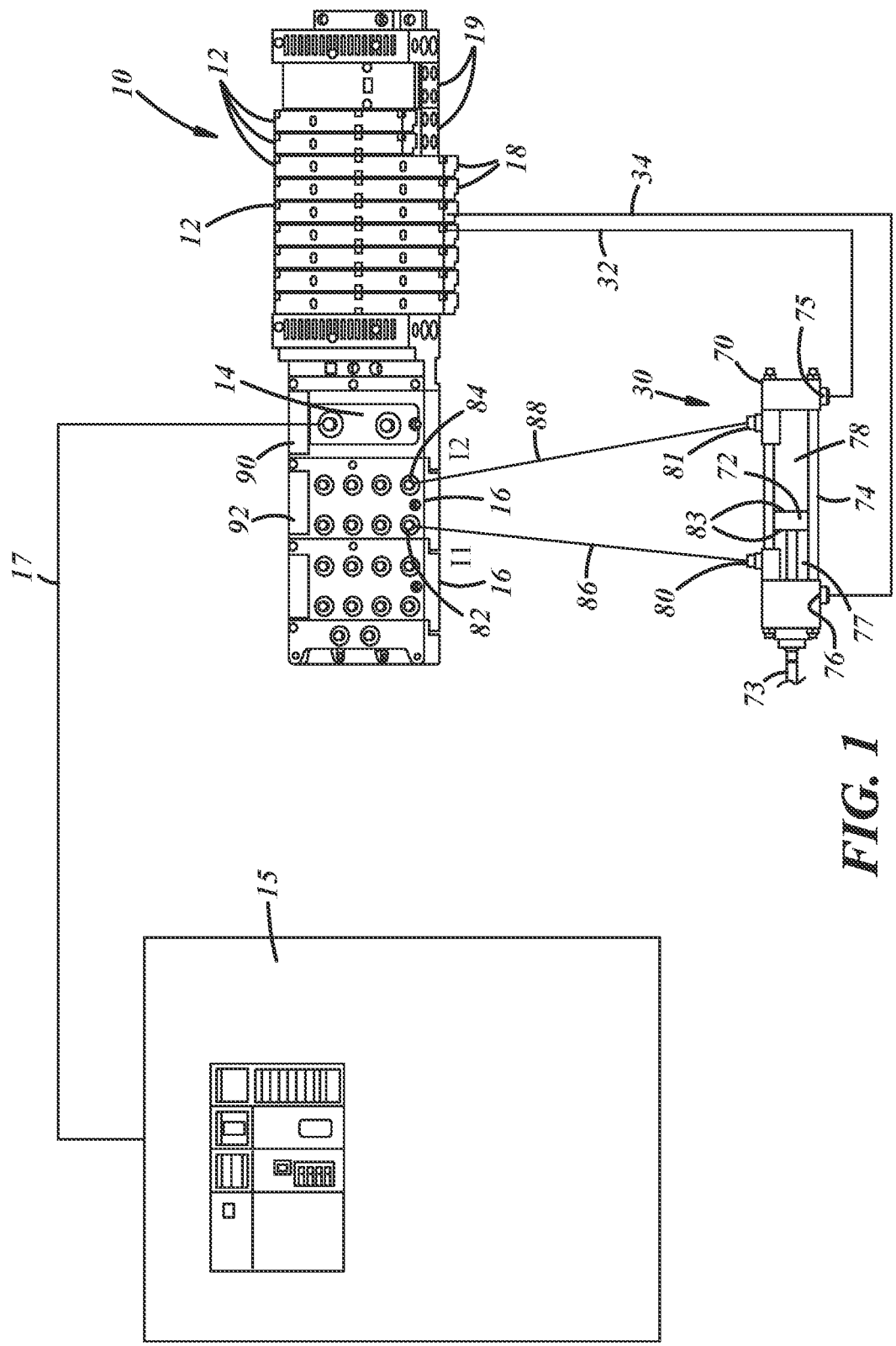
FIG. 1 is a perspective and partially schematic overview of one embodiment according to the invention.

Referring now to FIG. 1, a fieldbus manifold system 10 is modular in nature and has a plurality of valve manifold members also referred to as valve stations or manifold units 12 interconnected together with a communication module 14 and a series of I/O modules 16. The communication module 14 may be connected to a fieldbus network 17 controlled by a Programmable Logic Controller (PLC) and communication card 15. The particular number of manifold units 12 is dependent on the application and the capacity of the circuitry installed in each unit 12. Each manifold unit 12 includes a manifold block 19 which may mount one or more control valves 18 on its upper surface 13 as shown in FIG. 2.

Figure 2:
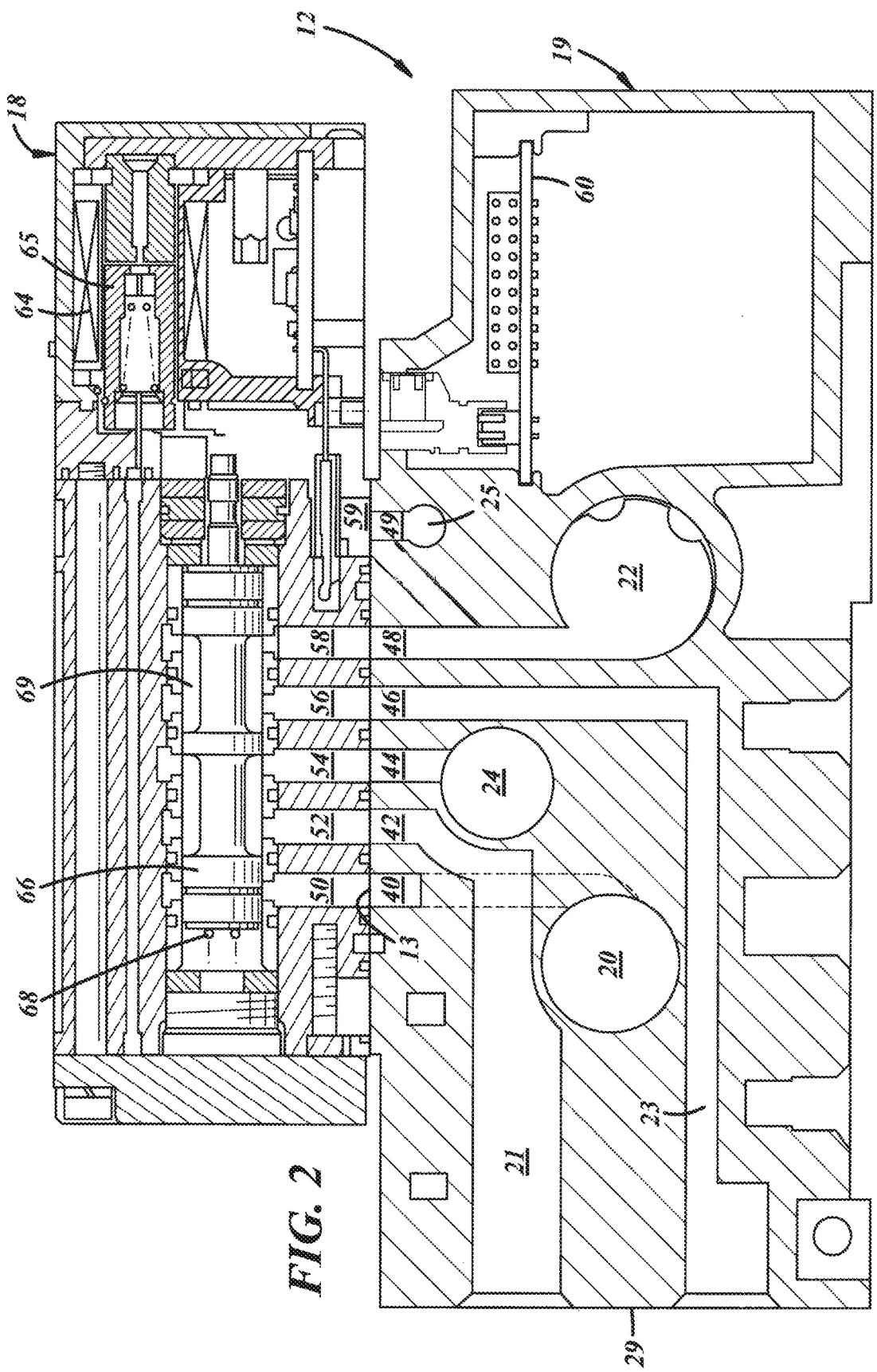
FIG. 2 is a cross sectional view of the valve housing and manifold block shown in FIG. 1.
Figure 3:
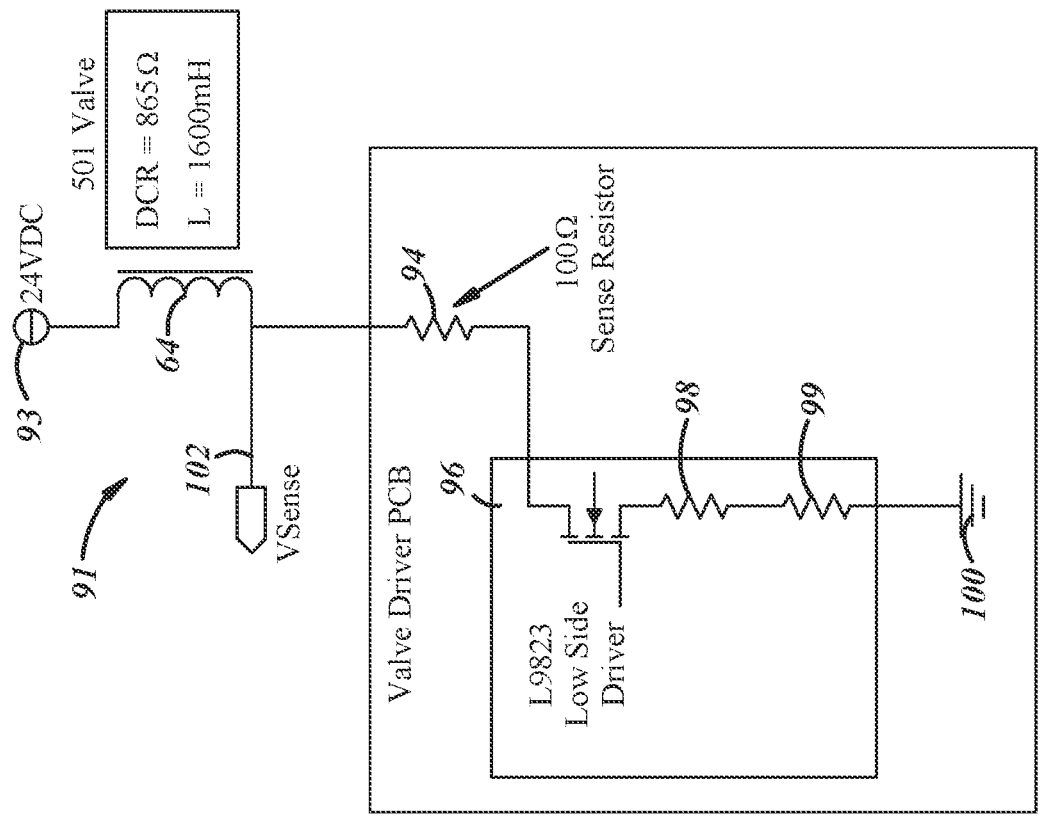
FIG. 3 is a schematic illustration of a circuit according to one embodiment of the invention.

Referring to FIGS. 2 and 3, each manifold block 19 has fluid supply 24 and fluid exhaust passages 20, 22, that extend laterally through the block to be in communication with an adjacent block 19. Each manifold block also has working ports 21 and 23 that extend to an outer wall 29 for connecting to a pneumatically operated field device 30 through two pneumatic conduits 32 and 34 as showing in FIG. 1. Each manifold block also has a transverse pilot pressure passage 25. Each passage 20, 21, 22, 23, 24, and 25 connects to a respective port 40, 42, 48, 46, 44 and 49 at the upper surface 13 of the manifold block 19 which are in communication with respective ports 50, 52, 58, 56, 54, and 59 in valve 18.

A circuit board 60 is mounted in the manifold block 19 in known fashion and supplies electric power to the solenoid valve coil 64 of the pilot valve 65 for actuating the solenoid valve 18 by moving its spool 66 through a valve bore 69 by the force pneumatic pressure from port 59 via pilot valve 65. When the spool 66 axially moves in the bore 69, it controls the fluid pressure communication between the ports 50-58, i.e. the opening and closing of ports 50-58. In a well-known fashion, the spool 66 may be biased to one direction by a spring 68. Although the embodiment shown is a single solenoid valve system, it will be understood that commercially available dual solenoid valve assemblies may also be used. Briefly, when a dual solenoid valve is used, the return spring 68 is eliminated and a second solenoid pilot is operated to provide fluid pressure to return the spool 66 (to the right as shown in FIG. 2).

The field device 30 in FIG. 1 is commonly operated by a piston and cylinder assembly 70 which has a piston 72 connected to a piston rod 73 that extends out of one end 76 of cylinder 74. The piston 72 is slidably housed within the cylinder housing 74 between a retracted position (piston to the right in FIG. 1) and an extended position (piston to the left in FIG. 1). The pneumatic conduits 32 and 34 are connected to opposite ends 75 and 76 and in communication to opposite internal pressure chambers 77 and 78 to provide fluid pressure to either chamber 77 and 78 for cycling the piston 72 back and forth within the cylinder housing 74 to either retract or extend the piston rod 73.

Two position sensors 80 and 81 are mounted on cylinder housing 74. These position sensors 80 and 81 may be Hall-effect, inductive or other sensors types which sense the presence of a magnetic field or the position of the piston. The piston 72 may have a magnet 83 mounted thereon which when in proximity to either sensor 80 or 81 triggers the sensor to send an output signal.

The position sensors 80 and 81 are each electrically connected to a separate input port 82 and 84 of the respective I/O unit 16 corresponding to the valve 18 that is pneumatically connected to the field device 30. The connection is through two electrically conductive cables 86 and 88. Wireless communication is also foreseen as a possibility.

The general operation of the disclosed embodiment is discussed in U.S. Ser. No. 16/468,898 filed on Jun. 12, 2019 which is hereby incorporated by reference.

In this fashion, by having the signal that initiates the cycle also turning on the timer and timing the cycle from the moment a signal is initiated until the piston achieves its end position achieves an improved level of prognostics which can be used for preventative maintenance algorithms. Any binding or problems with valve shifting timing, the cylinder and piston, the pneumatic tubing 32 and 34 or other binding parts of the field device connected to the piston rod 73 all of which could cause system cycle time changes can be detected. The cycle is monitored from its initiation to its end. The parameters that can affect the cycle time include leaks in the valve, cylinder, fitting and tubing. Also, for example; the manual change in the flow control, manual change in a pressure regulator, changes in load, binding in the cylinder and piston assembly caused by wear or rod side loading, valve wear, cylinder wear, weak return spring in the solenoid valve, sensor malfunction, input module malfunction and other changes or malfunctions in the system.

The timing of the cycle commencing with the actuating voltage change sent to the coil and ending with the piston reaching its end can be used to monitor the function and if any changes over time and deviations from the set forth proper time is sensed, an appropriate alarm can be sent to provide warning that something in the line from the coil and valve to the field device is not operating up to design and set standards.

Referring now to FIG. 3, circuit 91 is shown which expeditiously directs the diagnostic test measurement specifically to detecting changes in the inductive reactance of the coil 64 that drives the solenoid pilot valve 65. The coil 64 is connected to a DC power source 93 which for example can be set at 24 V, a resistive element (labeled as sense resistor) 94, and a low side driver 96 which is imbedded in a valve driver printed circuit board (PCB). The driver has internal resistance schematically indicated as resistive elements 98 and 99. The downstream end is then grounded at 100, completing the electrical current path of the circuit.

The coil 64 which is commercially available may have a Direct Current resistance (DCR) of 865 ohms and a stated inductance value L of 1600 mH. The resistive element 94 may have a resistance that is low enough so as not to affect the operation of the coil 64 but high enough to make measurement of any voltage drop variances practical. A resistive element of 100 Ohms may be suitable for the above described coil 64.

Figure 4:
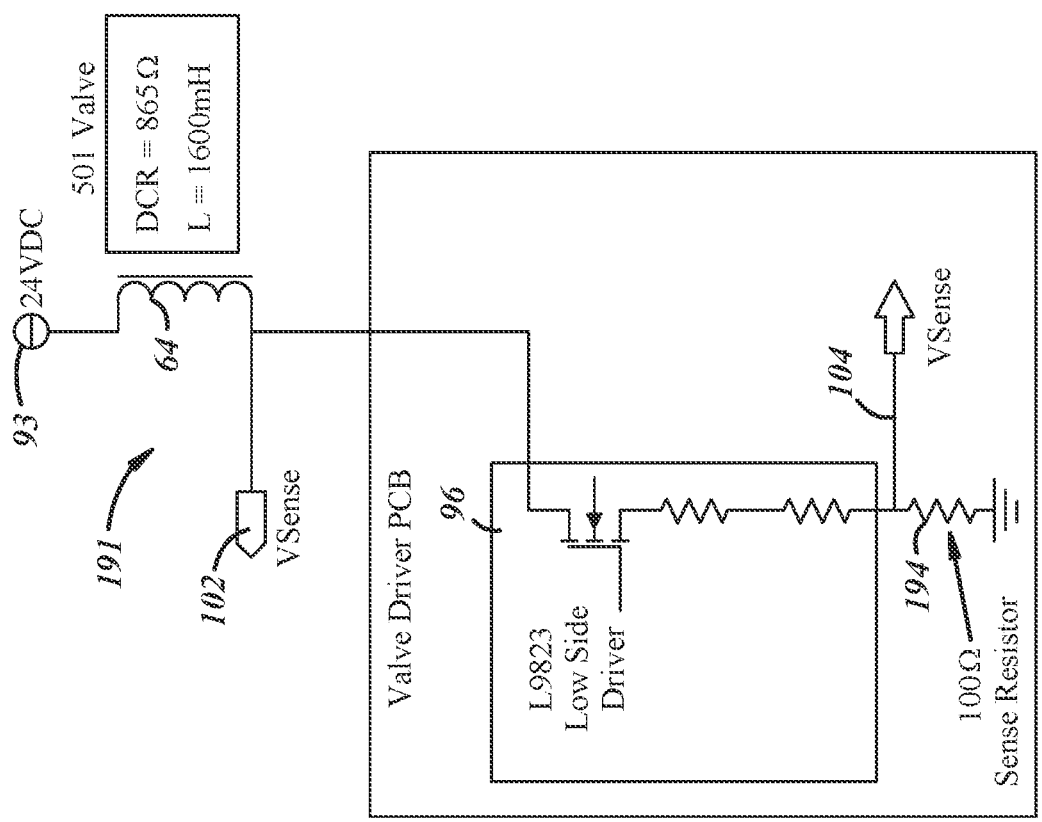
FIG. 4 is a schematic illustration of a second embodiment of the invention.

Referring now to FIG. 4, an alternate circuit 191 is shown that expeditiously directs the diagnostic test measurement specifically to detecting changes in the inductive reactance of the coil 64 that drives the solenoid valve core 65. The coil 64 is connected in series to a low side driver 96 which is imbedded in a valve driver printed circuit board. The driver has internal resistance schematically indicated as resistive elements 98 and 99. The downstream end is then connected to a resistive element (labeled as sense resister) 194 which in turn is connected to ground 100, completing the electrical current path. Beside voltage sensor 102, an additional voltage sensor 104 may be installed between low side driver 98 and resistive element 194.

It is well known that the inductive reactance of a coil is calculated by the following mathematical relationship:

$$X_L = \omega L = 2\pi f L$$

Where $X_L$ is inductive reactance, f is frequency of variable voltage and L is inductance. It is also well known that voltage follows Ohms law by the equation $$V = IR$$

A numerical example to illustrate the concept of the invention follows. While the power source 93 is a direct current supply and set at 24V, the sensed voltage at sensor 102 will be at 24 volts when the driver 96 is open and in an equilibrium state and practically at 0 when driver 96 is closed causing the valve to actuate and reach an equilibrium state.

A test algorithm may be supplied or programmed to the low side driver 96 to supply a pulse train, i.e. a frequency burst may be applied to the driver 96 to open and close at a predetermined frequency for a brief period of time. A frequency of 1000 Hz can be used for a short duration for example 1/1000 second. The duration and frequency are short enough so as not to affect the actuation of the solenoid. The average voltage is sensed at either sensor 102 or 104 and recorded at the communication module 15. The pulse train may re-occur at regular intervals such as once every 10 minutes during activation to continuously monitor changes.

However, during the test pulse by the low side driver, a pulse frequency is seen by coil 64 which in turn creates a reactance based on the known mathematical relationship $X_L = \omega L = 2\pi f L$. Thus, with 1000 Hz pulsing a 1.6 H coil, an inductive reactance of approximately 10053 ohms is seen. By using the inductive reactance value plus its DC resistance (DCR value in FIG. 4) as a simple resistive element, a simple series circuit is created with the connected coil 64, valve driver PCB 96 and Sense Resistor element 194. Using Ohms law V=IR, the sum of all the voltage drops across each resistive element must equal the total applied voltage. Therefore, any resistance change in any of the resistive elements will create a voltage drop change that is proportional to the resistive element's value. Hence, if the inductance of coil 64 changes, it's inductive reactance changes and the proportional voltage change can be measured across any of the resistive elements of the series circuit while it is in its dynamic state. Using the sample values in FIG. 4 of 1000 Hz pulse frequency to a 1.6 H coil creates an inductive value of about 10053 ohms. Consequently, the voltage sensor 104 positioned in series between the coil 64, valve driver PCB 96 (resistive value assumed to be negligible) and resistive element 94 of 100 ohms, reads a voltage drop calculated by [Applied voltage (93)]/[inductive reactance (Xc)+DCR (865)+Sense Resistor element (194)]×[Sense Resistor element (194)]=24/(10053+865+100)×100=218 mV. Thus the sensor 104 will read a sensed voltage of 23.782 voltages. If the Valve Driver internal resistance is not negligible then the circuit 91 in FIG. 3 can be used and the voltage from sensor 102 could be used.

There may be situations where the combination of DCR, inductance value of the coil and required test frequency may cause the coil to energize during the diagnostic test measurement operation. In such situations, the direct source voltage 93 may be stepped down during the diagnostic test measurement operation to a lower magnitude, i.e., a lower voltage 192 as shown for example in FIG. 5. In the example shown in FIG. 5, the source voltage during diagnostic test measurement operation is stepped down to a lower magnitude of 3.3 V. In this situation, the lower magnitude of the supplied voltage prevents actuation of the solenoid valve. In either situation, the frequency pulse has a characteristic so as not to actuate the solenoid valve during the diagnostic test measurement operation. After the frequency pulse is sent and voltage drop measured, the DC power level can revert back to the 24 V level shown at 93 for normal operations.

Figure 5:
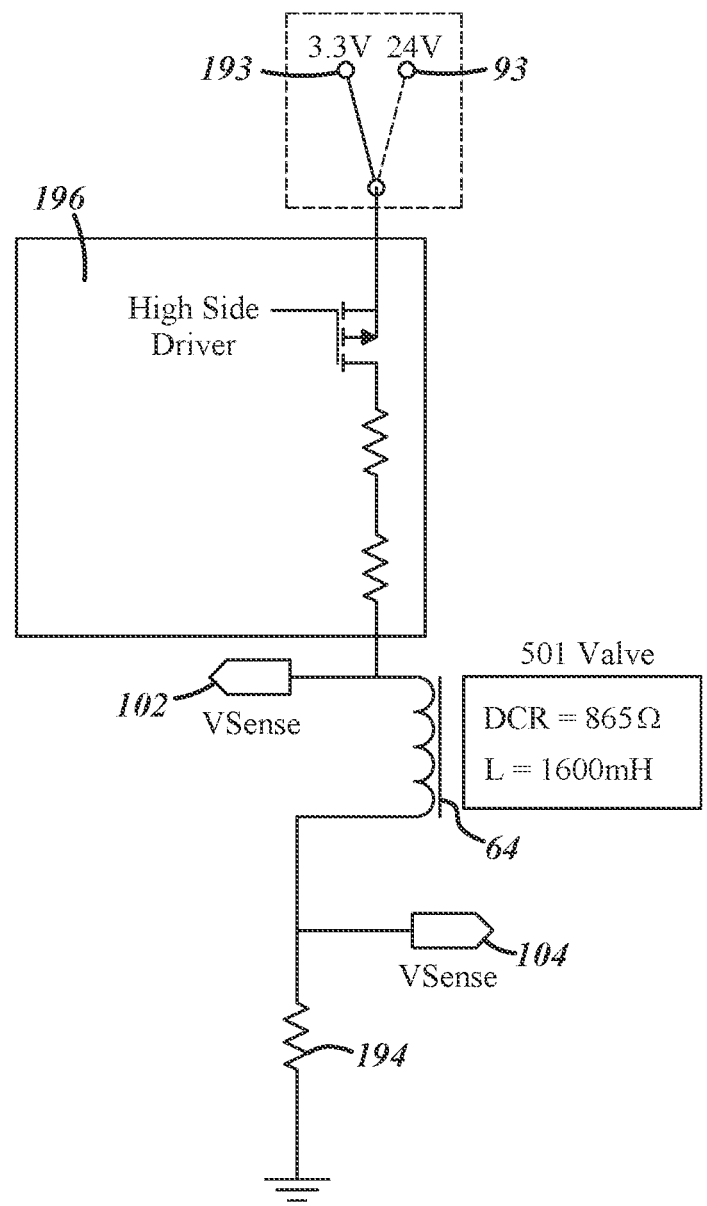
FIG. 5 is a schematic illustration of a third embodiment of the invention.

As also shown in FIG. 5, the system can be used with a high side driver 196 which is situated upstream from the solenoid coil 64.

In all the above embodiments, the initial value of the voltage is sensed and stored in the memory controlled by the microcontroller of the fieldbus manifold communication module 14. Subsequent test compares the values of sensed voltage with the initial voltage and upon a change (i.e. increase) of a predetermined magnitude the communication module 14 transmits an indicator warning which can be read either at the PLC and its associated display (HMI) or at the appropriate I/O unit module 16 at display 92 or the display 90 of the communication module 14. Knowing the resistive value of the circuit and the resistive value of resistive element 94 or 194, the reactance $X_L$ of the solenoid coil 64 can be calculated by using the sensed voltage. The change in current in the series circuit made up of the reactance $X_L$ value of coil 64, the internal resistive value of the driver 98 and 99, and the value of the sense resistive element 94 or 194 is the factor that allows a base line for monitoring change. Since the inductance of coil 64 cannot be measured directly in a dynamic circuit, an indirect representative value is obtained by calculating its inductive reactance Xc. By comparing changes of Xc over time, indirectly measured by voltage drops of the Sense Resistor element 102 and 194 circuit, removes the need to empirically know the value of the coil 64 inductance. The critical measurement to determine degradation of the coil, now becomes the Vsense voltage change over time. Since the comparison of the initial value of the voltage drop, which is proportional to the coil's inductive reactance $X_L$, is compared to successive measurements the variations or deviations of the actual inductance value of the coil from its nominal value becomes irrelevant in that only the change of voltage over time is indicative of coil degradation. The rate of voltage change (i.e. increase) over time determines the rate of degradation and thus can be used to optimize frequency of maintenance (replacement) that is required to achieve the maximum machine/component up-time or availability.

In this fashion, an easy modification that is retroactively installable in known circuitry can be done and using the direct current power source 24 that is normally used to actuate the coil 64, and by interrupting the driver with a high frequency pulse or a lower magnitude voltage pulse, a change of voltage can be sensed over time that indicates a potential degradation of the coil 64. The change of voltage sensed later in time from the initial voltage becomes an indicator that the inductance in the coil 64 must have changed because the values of power source voltage 93, driver internal resistive element 98 and 99, sense resistor element 94 or 194 and the diagnostic test measurement operation frequency remain the same. The change of inductive reactance $X_L$ is an indication that the inductance value of the coil has changed which, with all things being equal, points to a change in the number of wire turns that make up the coil and most likely caused by the failure of the insulation around the wire used to wind the solenoid coil.

Other variations and modifications are possible without departing from the scope and spirit of the present invention as defined by the appended claims.

The invention claimed is:
1. A fieldbus control valve system characterized by:
   a communication module which is connected to at least one manifold member that includes a manifold blank connected to a valve body, said valve body having a solenoid operated control valve mounted therein and controlled and operated by a solenoid pilot having a coil for actuating said solenoid pilot;
   a direct current power source connected to the coil of the solenoid pilot;
   a driver connected in series with the direct current power source and the coil for actuating said solenoid pilot;

a resistive element connected in series with the direct current power source, said driver and said coil and a ground when the driver is actuated to power said coil;

said driver creating a frequency pulse train of voltage superimposed onto a DC energization signal for the coil of a predetermined duration during actuation of said driver, said driver creating said frequency pulse train having characteristics that do not cause the solenoid pilot to actuate in response to said frequency pulse train;

a voltage being sensed is sent to the communication module and its value is stored therein with subsequent measured voltage for subsequent pulse train measured and compared to a base voltage value stored in the communication module;

an indicator warning displayed on a display of said fieldbus control valve system when said measured voltage increases to a predetermined amount from said base voltage value.

2. A fieldbus control valve system as defined in claim 1, further characterized by:

said indicator warning displayed on the display being on an I/O unit corresponding to said solenoid valve on said fieldbus solenoid valve system for displaying the indicator warning.

3. A fieldbus control valve system as defined in claim 1, further characterized by:

said driver being a low side driver; and said resistive element connected between said low side driver and said coil of said solenoid pilot.

4. A fieldbus control valve system as defined in claim 3, further characterized by:

said communication module recording the measured voltage which is proportional to the reactance of the solenoid coil when initially installed and said measured voltage which is proportional to the reactance being used as the base voltage value.

5. A fieldbus control valve system as defined in claim 1, further characterized by:

said driver being a low side driver; and said resistive element interposed between said low side driver and said ground.

6. A fieldbus control valve system as defined in claim 5, further characterized by:

said communication module recording the measured voltage which is proportional to the reactance of the coil when initially installed and said measured voltage being used as the base voltage value.

7. A fieldbus control valve system as defined in claim 1, further characterized by:

said driver being powered to work the frequency pulse train of said actuation signal when said driver is to actuate said solenoid.

8. A fieldbus control valve system as defined in claim 1, further characterized by:

said driver being a high side driver; and said coil connected between said high side driver and said resistive element.

9. A fieldbus control valve system as defined in claim 1, further characterized by:

said frequency pulse train having a short enough duration and high enough frequency in time so as not to cause the solenoid pilot to actuate in response to said frequency pulse train.

10. A field bus control valve system as defined in claim 1, further characterized by:

said frequency pulse train having a low enough magnitude in voltage so as not to cause the solenoid pilot to actuate in response to said frequency pulse train.

11. A method of detecting degradation of a coil in a solenoid pilot in a fieldbus control valve system, said method characterized by:

providing a power circuit with a direct current power source that powers said solenoid coil;

providing a driver that communicates said power source to ground to close and open the power circuit;

providing a resistive element in series with said direct current power source, said driver and said solenoid coil;

generating a frequency pulse train to said driver having a characteristic so as not to affect actuation of said solenoid coil;

measuring an initial voltage level during said frequency pulse trains between said solenoid coil and said resistive element;

storing said initial voltage level in a memory device;

measuring a subsequent voltage level during a subsequent frequency pulse train;

comparing said subsequent voltage level to said initial voltage level; and providing an indicator warning when said subsequent voltage level has changed a predetermined amount from said initial voltage level.

12. A method as defined in claim 11, further characterized by: said initial and subsequent frequency pulse trains having a short enough duration and high enough frequency so as not to cause the solenoid pilot to actuate in response to said respective frequency pulse trains.

13. A method as defined in claim 11, further characterized by: said initial and subsequent frequency pulse trains having a low enough magnitude in voltage so as not to cause the solenoid pilot to actuate in response to said respective frequency pulse trains.

* * * * *